United States Patent [19]

Kawamura et al.

[11] Patent Number: 5,359,270

[45] Date of Patent: Oct. 25, 1994

[54] NUMERICAL CONTROL SYSTEM

[75] Inventors: Hideaki Kawamura, Hachioji; Kentaro Fujibayashi, Musashino; Shouichi Sagara, Minamitsuru, all of Japan

[73] Assignee: Fanuc Ltd., Minamitsuru, Japan

[21] Appl. No.: 842,762

[22] PCT Filed: Mar. 2, 1989

[86] PCT No.: PCT/JP89/00224

§ 371 Date: Oct. 19, 1989

§ 102(e) Date: Oct. 19, 1989

[87] PCT Pub. No.: WO89/08875

PCT Pub. Date: Sep. 21, 1989

Related U.S. Application Data

[63] Continuation of Ser. No. 432,759, Oct. 19, 1989, abandoned.

[30] Foreign Application Priority Data

Mar. 9, 1988 [JP] Japan .................... 63-55760

[51] Int. Cl.⁵ .................................... G05B 19/18
[52] U.S. Cl. ............................. 318/571; 318/567; 318/569; 364/474.22; 364/474.11
[58] Field of Search ............... 318/560–632; 364/474.01–474.32, 160–193

[56] References Cited

U.S. PATENT DOCUMENTS

| | | | |
|---|---|---|---|
| 3,522,588 | 8/1970 | Clarke, Jr. et al. | 364/474.11 X |
| 3,573,737 | 4/1971 | Rosenberg . | |
| 3,573,738 | 4/1971 | Bottles . | |
| 3,626,385 | 12/1971 | Bouma | 364/474.11 X |
| 4,029,950 | 6/1977 | Haga | 318/569 X |
| 4,069,488 | 1/1978 | Fiorenza et al. | 364/474.11 |
| 4,100,597 | 7/1978 | Fleming et al. | 364/474.11 |
| 4,262,336 | 4/1981 | Pritchard | 364/474.11 |
| 4,288,849 | 9/1981 | Yoshida et al. | 318/562 X |
| 4,422,027 | 12/1983 | Mohlere | 318/687 |
| 4,550,375 | 10/1985 | Sato et al. | 318/569 X |
| 4,564,913 | 1/1986 | Yomogida et al. | 364/474.11 |
| 4,608,645 | 8/1986 | Niwa et al. | 318/632 X |
| 4,638,227 | 1/1987 | Katayama et al. | 318/565 |
| 4,684,862 | 8/1987 | Rohrle | 318/568 |
| 4,841,431 | 6/1989 | Takagi et al. | 364/474.11 X |
| 4,882,670 | 11/1989 | Isobe et al. | 364/474.22 |
| 4,888,534 | 12/1989 | Kuchiki | 318/567 |
| 4,931,712 | 6/1990 | DiGiiulio et al. | 318/562 X |
| 5,010,285 | 4/1991 | Kawamura et al. | 318/569 |

FOREIGN PATENT DOCUMENTS 0189757  1/1986  European Pat. Off. .

OTHER PUBLICATIONS

Van Campenhout, J. M., "A Concurrent high-level Language based real-time Controller", *Journal of the Institution of Electronic and Radio Engineers*, vol. 58, No. 2, Apr. 1988, pp. 57–67.
Patent Abstracts of Japan, vol. 7, No. 216, Sep. 24, 1983 for JP-A-58-109962 (Fujitsu) Jun. 30, 1983.
Patent Abstracts of Japan, vol. 7, No. 203, Sep. 8, 1983 for JP-A-58-102653 (Yamazaki) Jun. 18, 1983.

*Primary Examiner*—Paul Ip
*Attorney, Agent, or Firm*—Staas & Halsey

[57] ABSTRACT

A numerical control system controls a plurality of axes with a plurality of channels (10~40). A plurality of spindles (61~64) or automatic tool changer controllers (51, 52) are selected and controlled by the channels (10~40) according to machining programs. The numerical control system efficiently controls a machine tool having a number of spindles and automatic tool changer controllers.

1 Claim, 3 Drawing Sheets

FIG. 2

```
0001;
N1 G68.1  S1   ;...①
N2 M03;
N3 S2000;     .....②
N4 G01X100.  F2000 ;
        ⋮
N99 G68.1 S4;.....③
        ⋮
```
71 MACHINING PROGRAM FOR CHANNEL 1

```
0002;
N1 G68.1  S2 ;.... ④
N2 M03;
N3 S4000;    ....⑤
N4 G01X50.   F2000 ;
        ⋮
```
72 MACHINING PROGRAM FOR CHANNEL 2

```
0003;
N1 G68.1 S3 A1;... ⑥
N2 M03;
N3 S1000;  .......⑦
N4 G01X150.  F2000 ;
        ⋮
```
73 MACHINING PROGRAM FOR CHANNEL 3

NUMERICAL CONTROL SYSTEM

This application is a continuation of application Ser. No. 07/432,759, filed Oct. 19, 1989, now abandoned.

TECHNICAL FIELD

The present invention relates to a numerical control system having a plurality of channels, and more particularly to a numerical control system for selecting and controlling a plurality of spindle or tool changer controllers with a plurality of channels.

BACKGROUND ART

There have widely been used numerical control systems for controlling a number of axes or spindles with a plurality of channels (functional arrangements). Such numerical control systems include a numerical control system for controlling a four-axis lathe having two spindles and two tool rests. A workpiece can be machined at a high speed by the spindles or tool rests. With the four-axis lathe or the like, controllers each for controlling one of the spindles and one of the tool rests are fixed or switched by parameters.

Numerical control apparatus have been proposed which make up a complex numerical control system with an increased number of channels (functional arrangements) in order to control a complex machine tool.

If spindles or automatic tool changer controllers are controlled in a fixed manner in the numerical control system with a number of channels, then a long period of time is wasted, and it is difficult to achieve efficient machining operation. Therefore, it is desired that the numerical control system be controlled more flexibly.

SUMMARY OF THE INVENTION

In view of the aforesaid problems of the conventional numerical control systems, it is an object of the present invention to provide a numerical control system which can select and control a plurality of spindles or tool changer controllers with a plurality of channels.

According to the present invention, the above object can be achieved by a numerical control system for controlling a plurality of axes with a plurality of channels (functional arrangements), comprising means for selecting and controlling a plurality of spindles or automatic tool changer controllers with a plurality of channels according to machining programs.

By selecting and controlling the spindles or the automatic tool changer controllers with the channels, any one of combinations of spindles and tool rests can be selected as desired for more flexible machining of a workpiece.

BRIEF DESCRIPTION OF THE DRAWINGS

FIG. 2 is a diagram showing, by way of example, machining programs for respective channels.

DESCRIPTION OF THE PREFERRED EMBODIMENT

An embodiment of the present invention will hereinafter be described with reference to the drawings.

Figure 1:
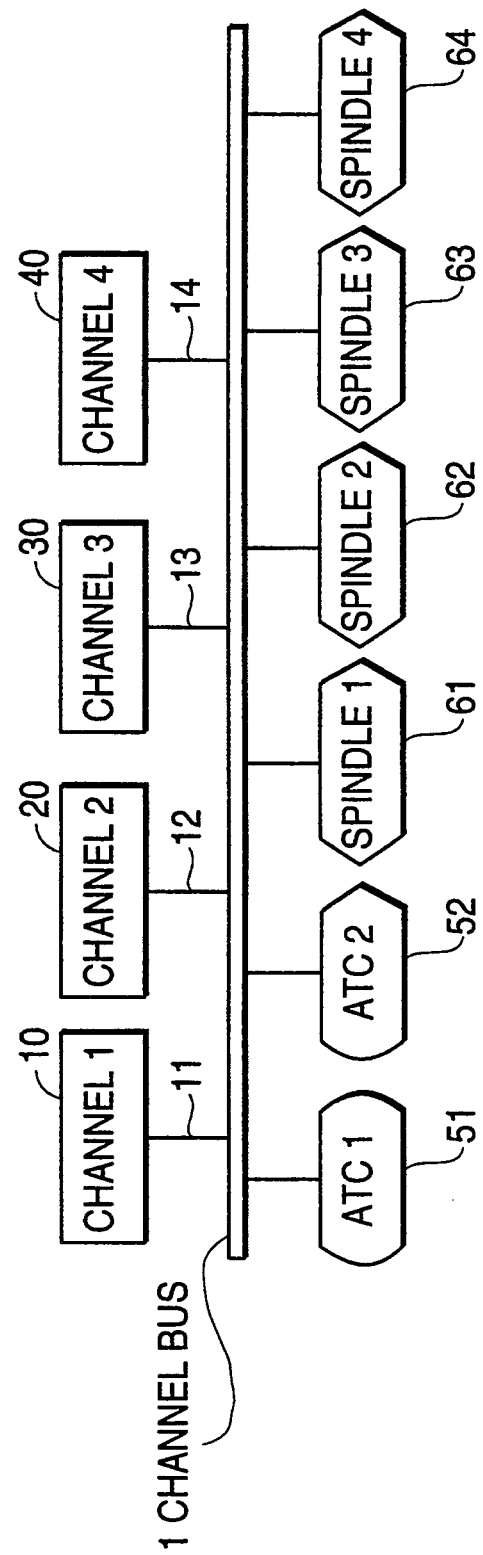
FIG. 1 is a block diagram of a numerical control system according to the present invention.

FIG. 1 shows in block form a numerical control system according to the present invention. A channel bus 1 is connected via connections 11–14 to a plurality of channels 10, 20, 30, 40, each for reading, decoding, and executing a machining program. Each of the channels has a function equivalent to the function of a single numerical control apparatus.

Denoted at 51, 52 are automatic tool changer controllers (ATC), and 61, 62, 63, 64 spindles each including a spindle control circuit, a spindle amplifier, a spindle motor, and a spindle. Actually, the numerical control system also includes a master channel for controlling the entire system, axis control modules for controlling the axes, a CRT/MDI unit, and peripherals, which are however omitted from illustration in FIG. 1. The connections 11–14 provide a plurality of receiving means corresponding to the channels 10, 20, 30, 40, for receiving the machining programs read by the corresponding channels from peripheral(s) such as a memory or a tape reader.

FIG. 2 shows machining programs for the channels, by way of example. Denoted at 71 is a machining program for the channel 1, 72 a machining program for the channel 2, and 73 a machining program for the channel 3. According to the machining program 71 for the channel 1, the spindle 1 is selected by the following commands:

N1 G68. 1 S1

As the machining program goes on, the spindle 4 is put under the control of the channel 1. Thus, channel 1 acts as selecting means for selecting spindle 1 and then spindle 4. Likewise, the spindle 2 is selected according to the machining program 72 for the channel 2, and the spindle 3 is selected according to the machining program 73 for the channel 3. In each of the channels, a selected spindle is controlled.

According to the machining program 73 for the channel 3, the automatic tool changer controller 1 is selected by a command "A1" from commands:

N1 G68. 1 S3 A1;

and the automatic tool changer controller 1 is put under the control of the channel 1.

The control of the spindle and automatic tool changer controller can be transferred from one channel to another channel according to a command in the machining program for the one channel, so that the commands will be executed in the channel which has more execution time. The processing capability, is therefore speeded up and also that the combinations of the spindles and tool rests may be changed. Therefore, a tool machine which has heretofore been controlled in a fixed manner can be controlled so as to provide a more complex function.

Figure 3:
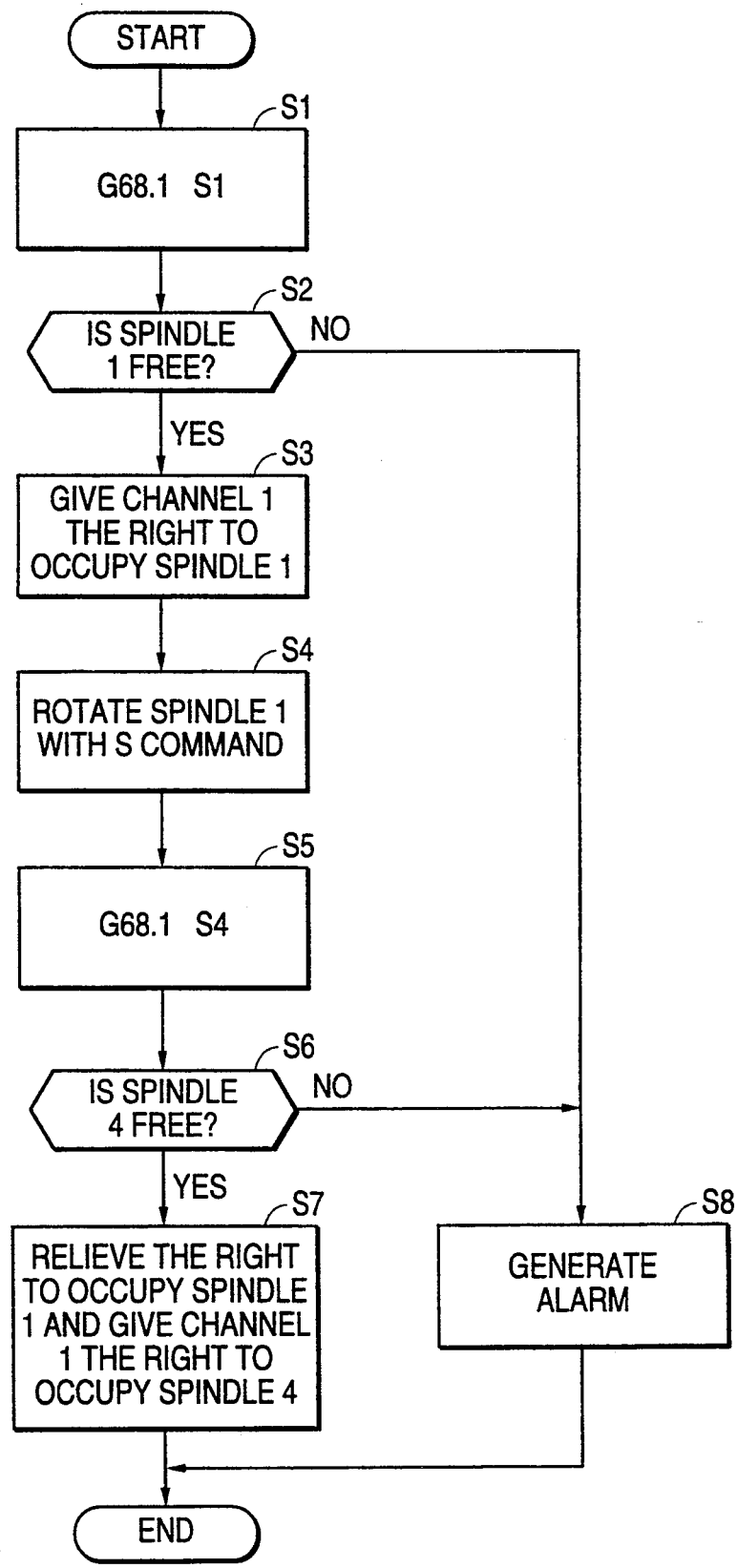
FIG. 3 is a flowchart of a sequence of operation of the numerical control system.

FIG. 3 shows a sequence of operation of the numerical control system of the present invention. Here, the transfer of occupancy for the control of a spindle will be described. The numerals following "S" indicate step numbers.

[S1] The spindle 1 is selected by a machining program.
[S2] It is determined whether the spindle 1 is not under the control of another channel. If the spindle is free (not occupied), then control goes to a step S3, and if occupied, then control goes to a step S8.

[S3] The channel 1 is given the right to occupy the spindle 1, and the spindle 1 is subsequently put under the control of the channel 1.

[S4] The spindle 1 is rotated at a predetermined speed by an S command. Although not shown in the flowchart, the spindle 1 is thereafter controlled by the channel 1 to machine a workpiece. After the machining process is finished, the spindle to be controlled by the channel 1 is changed.

[S5] The spindle 4 is then selected by the channel 1.

[S6] It is determined whether the spindle 4 is free or not. If free, then control goes to a step S7, and if not, then control goes to a step S8.

[S7] The right to occupy the spindle 1 is relieved, and the right to occupy the spindle 4 is given to the channel 1.

[S8] Since the spindle to be occupied is occupied by another channel, an alarm is generated.

In this manner, the spindle is selected by each of the channels, and used to machine the workpiece. The control of the axes is also changed in relation to the spindles.

In the above description, the spindles are selectively controlled by the channels. However, the automatic tool changer controllers can also be selectively controlled by the channels. Furthermore, the spindles and the automatic tool changer controllers may be combined in an appropriate combination and selected. As a result, the machine tool can be controlled more flexibly.

According to the illustrated sequence, if spindle to be occupied is occupied by another channel, an alarm is generated. However, the processing may wait until the occupancy of the spindle is relieved.

With the present invention, as described above, since the spindles or the automatic tool changer controllers are selected and controlled by the channels, a tool machine having a number of spindles or automatic tool changer controllers can be controlled more efficiently.

We claim:

1. A method of controlling a plurality of spindles of a single machine tool using a plurality of numerical control channels, comprising the steps of:

(a) decoding a first numerical control code instructing use of a first spindle by one of the numerical control channels;

(b) checking availability of the first spindle;

(c) assigning use of the first spindle to a first numerical control channel when the spindle is available;

(d) controlling rotation of the spindle by the one of the channels in accordance with the first numerical control code;

(e) preventing steps (c) and (d) until the spindle becomes available, if the spindle was previously assigned to one of said numerical control channels when checked in step (b);

(f) decoding a second numerical control code instructing use of a second spindle by one of the numerical control channels;

(g) checking availability of the second spindle; and (h) releasing use of the first spindle and assigning use of the second spindle to the first numerical control channel when the second spindle is available and the first numerical control channel has completed said controlling in step (d).

* * * * *